(12) United States Patent
Morita et al.

(10) Patent No.: US 11,113,179 B2
(45) Date of Patent: Sep. 7, 2021

(54) INFORMATION PROCESSING DEVICE, INFORMATION PROCESSING METHOD, AND COMPUTER READABLE MEDIUM FOR A TRACE PROCESS

(71) Applicant: Mitsubishi Electric Corporation, Tokyo (JP)

(72) Inventors: Koji Morita, Tokyo (JP); Yiguo Yan, Tokyo (JP); Kana Wato, Tokyo (JP); Kazuki Hibino, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/968,170

(22) PCT Filed: Mar. 19, 2018

(86) PCT No.: PCT/JP2018/010894
§ 371 (c)(1),
(2) Date: Aug. 7, 2020

(87) PCT Pub. No.: WO2019/180794
PCT Pub. Date: Sep. 26, 2019

(65) Prior Publication Data
US 2021/0004316 A1    Jan. 7, 2021

(51) Int. Cl.
*G06F 11/00* (2006.01)
*G06F 11/36* (2006.01)
*G06F 11/30* (2006.01)

(52) U.S. Cl.
CPC ...... *G06F 11/3636* (2013.01); *G06F 11/3055* (2013.01); *G06F 11/3058* (2013.01)

(58) Field of Classification Search
CPC ........ G06F 11/34; G06F 11/348; G06F 11/30; G06F 11/36; G06F 11/362;
(Continued)

(56) References Cited

U.S. PATENT DOCUMENTS 6,094,729 A * 7/2000 Mann .................... G06F 11/348
714/25
6,142,683 A * 11/2000 Madduri ............... G06F 11/348
703/23
(Continued)

FOREIGN PATENT DOCUMENTS

JP    2001-166969 A    6/2001
JP    2003-256242 A    9/2003
(Continued)

OTHER PUBLICATIONS

2019 Revised Patent Subject Matter Eligibility Guidance Appendix 1, p. 30-41 (Year: 2019).*
(Continued)

*Primary Examiner* — Jonathan D Gibson
(74) *Attorney, Agent, or Firm* — Xsensus LLP

(57) ABSTRACT

An information processing device includes a communication processing unit that performs communication with an external device according to an instruction from application software, and a trace processing unit that executes a first information trace process when a first predetermined condition is satisfied and executes a second information trace process when a second predetermined condition is satisfied. The first information trace process includes obtaining, from an operating system, environmental information that is information about an operating environment of the application software and writing the environmental information to an environmental information log file. The second information trace process includes writing, to a communication log file, information indicating a procedure of communication that the communication processing unit performs with the external device, obtaining the environmental information from the operating system, and writing the environmental information to the environmental information log file.

18 Claims, 5 Drawing Sheets

(58) Field of Classification Search
CPC ............. G06F 11/3668; G06F 11/3636; G06F 17/30569; G06F 17/40; G06F 11/3055; G06F 11/3058
See application file for complete search history.

(56) References Cited

U.S. PATENT DOCUMENTS

| | | | | |
|---|---|---|---|---|
| 6,189,140 B1* | 2/2001 | Madduri | ............... | G06F 11/348 712/227 |
| 6,202,199 B1* | 3/2001 | Wygodny | ........... | G06F 11/3636 702/183 |
| 6,351,829 B1* | 2/2002 | Dupont | ............... | G06F 11/0736 714/11 |
| 7,496,812 B1* | 2/2009 | Azimi | ............. | G01R 31/31705 710/317 |
| 8,601,324 B2* | 12/2013 | Horley | ................ | G06F 11/3476 714/45 |
| 9,875,041 B1* | 1/2018 | Redko | ................... | G06F 3/0619 |
| 2001/0044841 A1* | 11/2001 | Kosugi | ................. | H04L 41/069 709/223 |
| 2005/0033553 A1* | 2/2005 | Swaine | ............... | G06F 11/3476 702/176 |
| 2005/0039078 A1* | 2/2005 | Bradley | ................ | G06F 11/348 714/25 |
| 2006/0075306 A1* | 4/2006 | Chandrasekaran | ........................ | G06F 11/3688 714/47.2 |
| 2007/0130320 A1* | 6/2007 | Morgan | ............. | G06F 11/3636 709/224 |
| 2007/0168997 A1* | 7/2007 | Tran | .................... | G06F 11/3664 717/129 |
| 2008/0031145 A1* | 2/2008 | Ethier | ..................... | H04L 45/28 370/248 |
| 2008/0127108 A1* | 5/2008 | Ivanov | ................ | G06F 11/3476 717/128 |
| 2008/0127110 A1* | 5/2008 | Ivanov | ................ | G06F 11/3476 717/128 |
| 2008/0215863 A1* | 9/2008 | DeWitt | ............... | G06F 11/3409 712/227 |
| 2009/0132862 A1* | 5/2009 | Martin | ................ | H04L 43/0811 714/45 |
| 2009/0327809 A1* | 12/2009 | Joy | ....................... | G06F 11/366 714/26 |
| 2011/0258612 A1* | 10/2011 | Matthiesen | ......... | G06F 11/3636 717/128 |
| 2012/0166887 A1* | 6/2012 | Horley | .................. | G06F 11/348 714/45 |
| 2014/0351656 A1* | 11/2014 | Moser | .................... | G06F 11/366 714/45 |
| 2015/0067428 A1* | 3/2015 | Singer | .............. | G01R 31/31705 714/729 |
| 2015/0254160 A1* | 9/2015 | Horley | ................ | G06F 11/3466 714/45 |
| 2016/0110238 A1* | 4/2016 | Burugula | ............ | G06F 11/0751 714/38.11 |
| 2016/0124838 A1* | 5/2016 | Feng | ................... | G06F 11/3624 714/38.13 |
| 2016/0232073 A1* | 8/2016 | Cook | .................. | G06F 11/3476 |
| 2017/0034382 A1 | 2/2017 | Miura et al. | | |
| 2017/0109253 A1* | 4/2017 | Shen | ....................... | G06F 11/34 |
| 2017/0262355 A1* | 9/2017 | Liu | ..................... | G06F 11/3636 |
| 2018/0143894 A1* | 5/2018 | Singh | .................. | G06F 11/3636 |
| 2019/0004929 A1* | 1/2019 | Fastabend | ........... | G06F 12/0875 |

FOREIGN PATENT DOCUMENTS

| | | |
|---|---|---|
| JP | 2004-295612 A | 10/2004 |
| JP | 2006-079485 A | 3/2006 |
| JP | 2009-110318 A | 5/2009 |
| JP | 2009-301079 A | 12/2009 |
| JP | 2013-152657 A | 8/2013 |
| JP | 2013-171431 A | 9/2013 |
| JP | 2016-085496 A | 5/2016 |
| JP | 2016-133867 A | 7/2016 |
| JP | 2017-033540 A | 2/2017 |

OTHER PUBLICATIONS

International Search Report and Written Opinion dated Jun. 26, 2018 for PCT/JP2018/010894 filed on Mar. 19, 2018, 9 pages including English Translation of the International Search Report.
Notification of Reasons for Refusal received for Japanese Patent Application No. 2018-557961, dated Jan. 8, 2019, 10 pages including English Translation.
Decision to Grant a Patent received for Japanese Patent Application No. 2018-557961, dated Apr. 2, 2019, 5 pages including English Translation.
Office Action dated Mar. 10, 2021 in India Patent Application No. 202027034159, 5 pages.

* cited by examiner

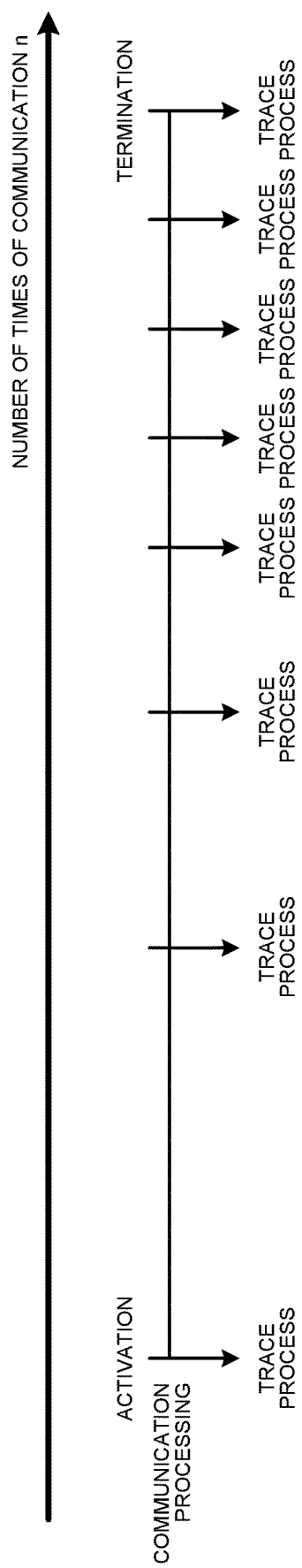

INFORMATION PROCESSING DEVICE, INFORMATION PROCESSING METHOD, AND COMPUTER READABLE MEDIUM FOR A TRACE PROCESS

CROSS-REFERENCE TO RELATED APPLICATION

The present application is based on PCT filing PCT/JP2018/010894, filed Mar. 19, 2018, the entire contents of which are incorporated herein by reference.

FIELD

The present invention relates to an information processing device that uses middleware which implements communication between application software and other devices, and also relates to middleware, an information processing method, and a program.

BACKGROUND

Middleware intermediates between an operating system (OS) and application software (hereinafter referred to as "applications") and provides specific functions for various applications. Communication middleware exchanges necessary information with another device that is external (hereinafter referred to as "external device") to establish a connection for an application that requests communication with the external device, and transmits data to and receives data from the external device on behalf of the application. Because the communication middleware performs communication with external devices, each application does not need to include an individual function of communicating with the external devices.

Generally, various kinds of software including the middleware each have a logging function of generating and storing, in a storage device, data that includes various kinds of information relevant to software operation, such as details and results of an executed process, for use in operation verification and examination intended for identification of a cause of an occurred defect.

Patent Literature 1 describes an invention according to which defect information is collected and stored for analysis of a defect in a program executed by a client terminal. According to the invention described in Patent Literature 1, upon detecting occurrence of the defect, software executed by the client terminal collects various kinds of information useful in the analysis of the defect and transmits these collected various kinds of information that have been collated as the defect information to a server. Upon receiving the defect information from the client terminal, the server stores this in a storage medium.

CITATION LIST

Patent Literature

Patent Literature 1: Japanese Patent Application Laid-open No. 2003-256242

SUMMARY

Technical Problem

The invention described in Patent Literature 1 is configured such that the information at the time of the defect occurrence is collected and stored, so that the occurred defect is located. However, if the occurrence of the defect results from operation of different software with a cause being, for example, a memory leak which occurs in association with operation of the different application, interrupt handling that occurs in association with performance monitoring performed by virus check software, or the like, the cause is difficult to identify only with the information at the time of the defect occurrence. For example, status changes of a memory are needed for ascertainment of whether or not the memory leak has occurred at the time of the defect occurrence; however, these changes cannot be ascertained because previous developments cannot be ascertained from only the information at the time of the defect occurrence.

The present invention has been made in view of the above, and an object of the present invention is to obtain an information processing device that is capable of collecting information for analysis of a cause of a defect which occurs under influence of operation of an application.

Solution to Problem

An aspect of the present invention is an information processing device that is implemented when an electronic computer executes middleware. The information processing device includes a communication processing unit that performs communication with an external device according to an instruction from application software installed on the electronic computer. The information processing device also includes a trace processing unit that executes a first information trace process when a first condition that is predetermined is satisfied and executes a second information trace process when a second condition that is predetermined is satisfied. The first information trace process includes obtaining, from an operating system installed on the electronic computer, environmental information that is information about an operating environment of the application software and writing the environmental information to an environmental information log file. The second information trace process includes writing, to a communication log file, information indicating a procedure of communication that the communication processing unit performs with the external device, obtaining the environmental information from the operating system, and writing the environmental information to the environmental information log file.

Advantageous Effects of Invention

The information processing device according to the present invention can collect information for analysis of a cause of a defect which occurs under influence of operation of an application.

BRIEF DESCRIPTION OF DRAWINGS

FIG. 6 illustrates another example of the timing of the information trace process that the communication middleware according to the embodiment executes.

DESCRIPTION OF EMBODIMENTS

With reference to the drawings, a detailed description is hereinafter provided of an information processing device, middleware, an information processing method, and a program according to an embodiment of the present invention. It is to be noted that this embodiment is not restrictive of the present invention.

Embodiment

Figure 1:
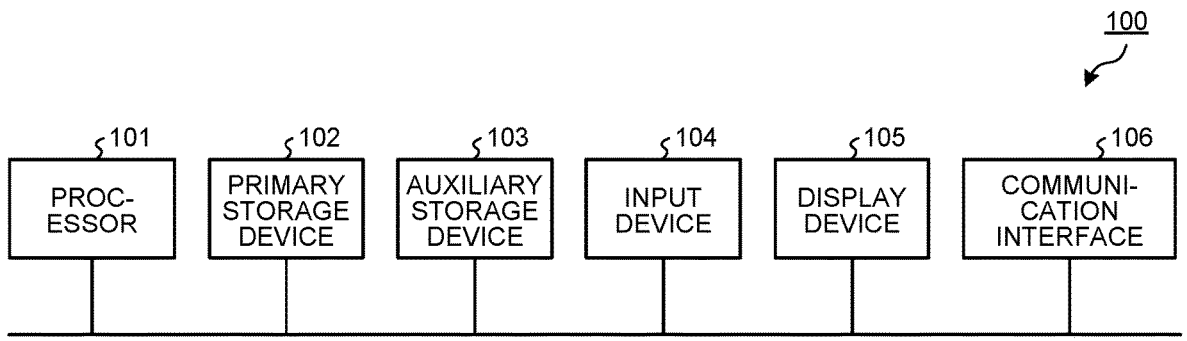
FIG. 1 illustrates an example of a hardware configuration of an electronic computer that executes middleware according to an embodiment of the present invention.

FIG. 1 illustrates an example of a hardware configuration of an electronic computer 100 that executes middleware according to the embodiment of the present invention. The electronic computer 100 that executes the middleware according to the present embodiment includes a processor 101, a primary storage device 102, an auxiliary storage device 103, an input device 104, a display device 105, and a communication interface 106.

The processor 101 is a central processing unit (CPU that is also called a central processor, an arithmetic unit, or the like).

The primary storage device 102 is main memory that functions as a work area of the processor 101. The primary storage device 102 includes a random access memory (RAM) and operates at a higher speed than the auxiliary storage device 103.

The auxiliary storage device 103 stores software and various data. The auxiliary storage device 103 includes a read-only memory (ROM), a hard disk drive, a solid-state drive (SSD), a removable memory device, or a combination of these. The middleware according to the present embodiment is stored in the auxiliary storage device 103. The processor 101 retrieves the middleware according to the present embodiment from the auxiliary storage device 103 to execute the middleware. When provided, the middleware according to the present embodiment is written to a storage medium such as an optical disk. This middleware is installed on the electronic computer 100, thus being written to the auxiliary storage device 103. In this way, the middleware becomes executable by the processor 101.

Examples of the input device 104 include a mouse, a keyboard, and a touch panel. Examples of the display device 105 include a liquid crystal monitor and a display. The communication interface 106 is a network interface card or the like and is used when the electronic computer 100 communicates with external devices such as other electronic computers across a network which is not illustrated.

Figure 2:
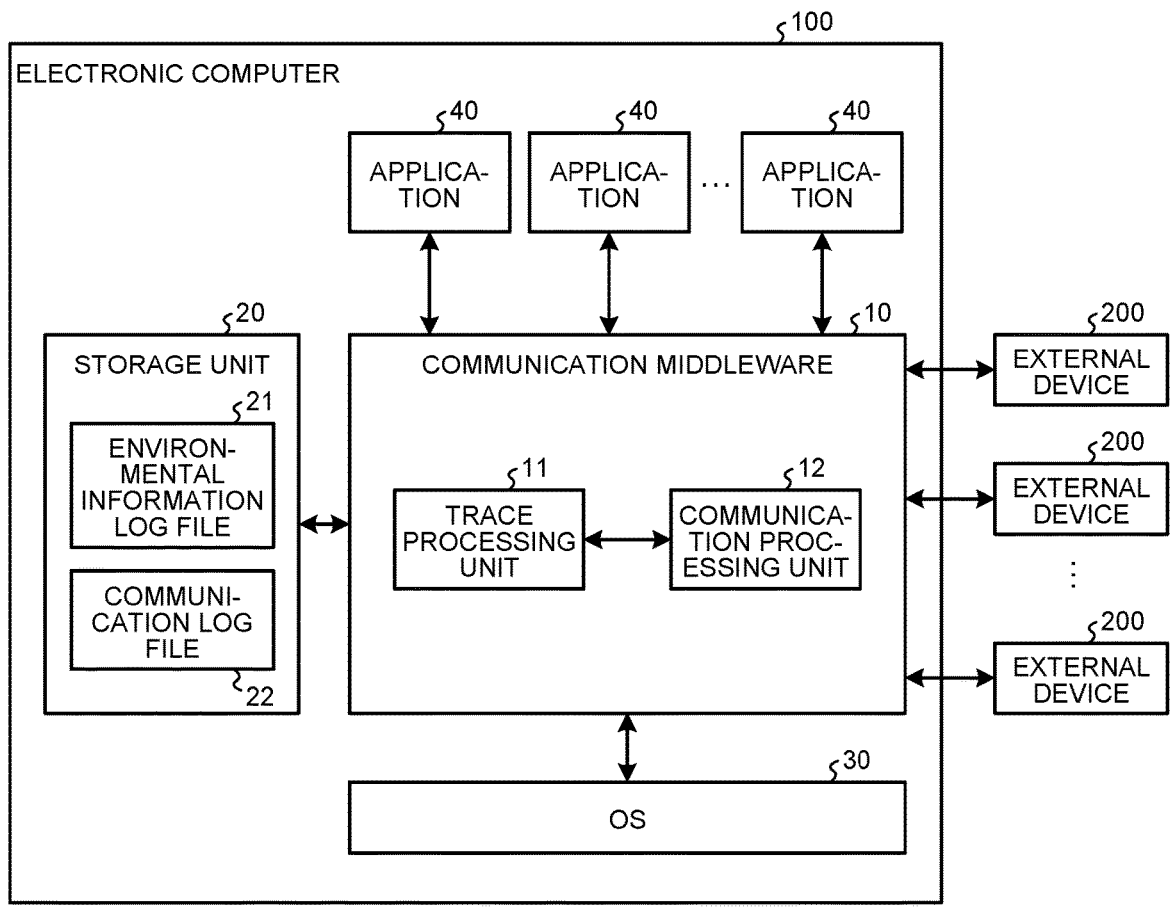
FIG. 2 illustrates an essential configuration of an information processing device according to the embodiment.

FIG. 2 illustrates an essential configuration of an information processing device according to the present embodiment. The information processing device according to the present embodiment is implemented when the electronic computer 100 illustrated by FIG. 1 executes the middleware according to the present embodiment. In other words, the information processing device according to the present embodiment corresponds to the electronic computer 100 executing the middleware according to the present embodiment. In a description below, the electronic computer 100 executing the middleware according to the present embodiment may be called the information processing device 100.

The middleware according to the present embodiment is communication middleware 10 and implements a trace processing unit 11 and a communication processing unit 12 of the information processing device 100. The communication middleware 10, an OS 30, and a plurality of applications 40 that are illustrated in FIG. 2 are executed by the processor 101 illustrated in FIG. 1. In addition, a storage unit 20 is implemented by the auxiliary storage device 103 illustrated in FIG. 1. The storage unit 20 retains an environmental information log file 21 and a communication log file 22 that are created and updated by the trace processing unit 11 of the communication middleware 10. The environmental information log file 21 and the communication log file 22 are files to which various kinds of information that are necessary for a process of analyzing an operational defect which is caused to the communication middleware 10 are written. Written to the environmental information log file 21 while being associated with date and time information is environmental information that is described later. Written to the communication log file 22 while being associated with date and time information is information indicating a procedure of communication that the communication middleware 10 has performed with the external device 200.

When a first predetermined condition has been satisfied, the trace processing unit 11 of the communication middleware 10 obtains the information from the OS 30 and writes the information to the environmental information log file 21. Moreover, when a second predetermined condition has been satisfied, the trace processing unit 11 retrieves and writes, to the communication log file 22, information written to a buffer area by the communication processing unit 12. The trace processing unit 11 also obtains the environmental information (described later) from the OS 30 and writes the environmental information to the environmental information log file 21. The information that the trace processing unit 11 writes to the communication log file 22 indicates a procedure of communication performed between the communication processing unit 12 and the external device 200. The communication processing unit 12 implements communication between the application 40 and the external device 200. The communication processing unit 12 uses the communication interface 106 illustrated in FIG. 1 to communicate with the external device 200. Moreover, when communication with the external device 200 has failed, the communication processing unit 12 notifies the trace processing unit 11 of the failure of the communication. Furthermore, when communicating with the external device 200, the communication processing unit 12 writes, to the buffer area, information indicating a procedure of the communication that the communication processing unit 12 has performed with the external device 200.

Figure 3:
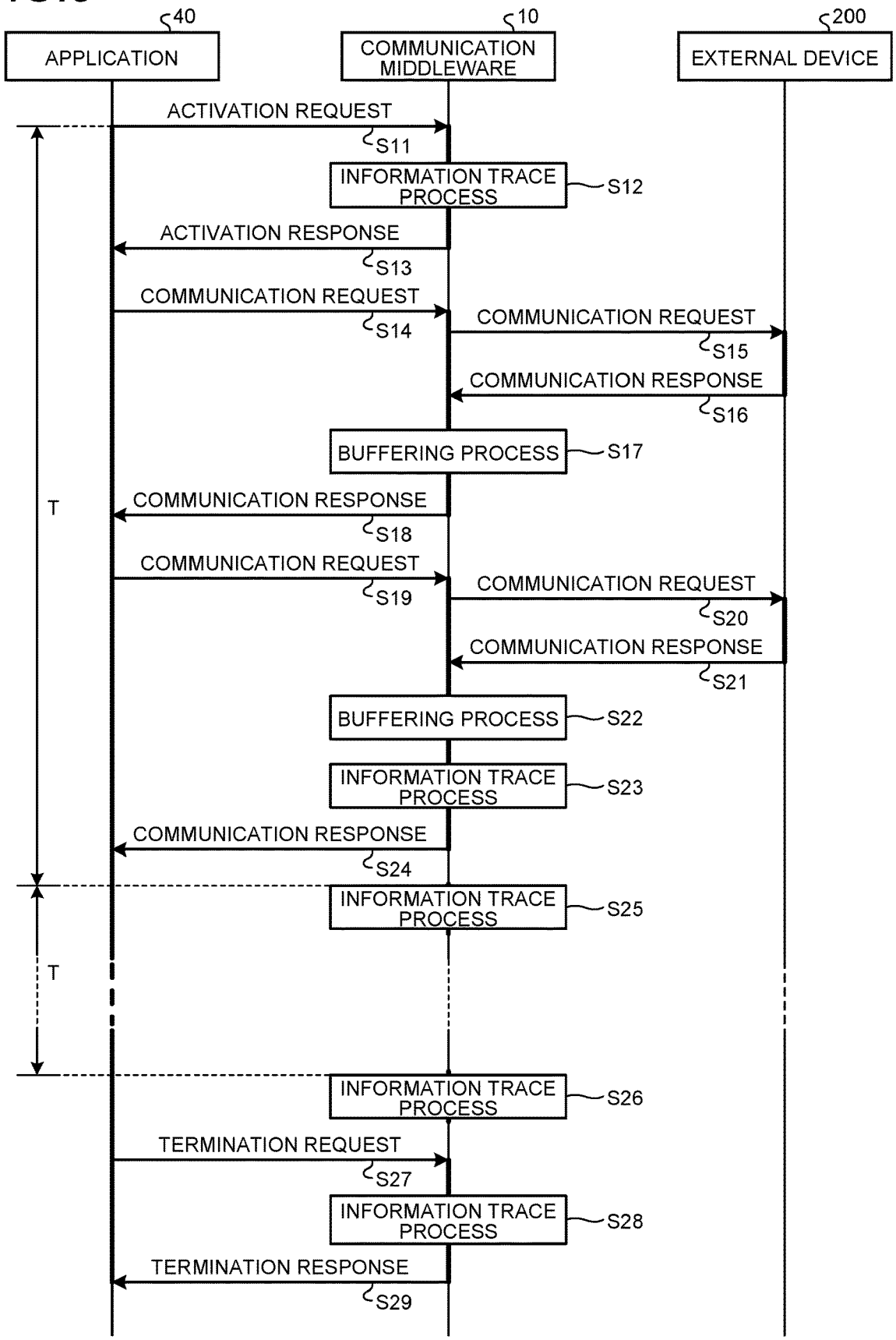
FIG. 3 is a sequence diagram illustrating an operational example of the communication middleware according to the embodiment.

FIG. 3 is a sequence diagram illustrating an operational example of the communication middleware 10 according to the present embodiment. When a need for communication with the external device 200 arises from, for example, user operation of the application 40 of the electronic computer 100, the application 40 transmits an activation request to the communication middleware 10 (step S11). Upon receiving the activation request, the communication middleware 10 executes an information trace process (step S12). Specifically, the trace processing unit 11 of the communication middleware 10 first requests, from the OS 30, the environmental information that is information about an operating environment of the application 40, thus obtaining the environmental information. It is to be noted that the environmental information also includes information about an operating environment of the communication middleware 10. In other words, the environmental information can be said to be information about an operating environment for both the application 40 and the communication middleware 10. It is to be noted here that the environmental information includes, for example, information about a running process, information about a status of use of the main memory, and information about a communication port being used. The status of use of the main memory includes both a status of use of physical memory and a status of use of virtual memory. The trace processing unit 11 uses a command that is supported by the OS 30 to obtain the environmental information. Next, the trace processing unit 11 writes the obtained environmental information along with date and time information to the environmental information log file 21 of the storage unit 20. The writing here refers to additional writing. If there is no environmental information log file 21 in the storage unit 20, the trace processing unit 11 creates the environmental information log file 21. In addition to the information trace process, the communication middleware 10 carries out setting that is necessary to start the communication with the external device 200. This setting is similar to the one that typical communication middleware carries out, so that its details are not described in detail. The information trace process that the trace processing unit 11 executes at step S12 is a first information trace process.

When the information trace process and the setting that is necessary to start the communication terminate, the communication middleware 10 transmits, to the application 40, an activation response indicating that activation has been completed, that is to say, preparation has been done to start the communication (step S13). Having received the activation response, the application 40 transmits a communication request to the communication middleware 10 (step S14). The communication request that the application 40 transmits to the communication middleware 10 includes information about the external device 200 being a communication partner, and data to be transmitted to the external device 200. Upon receiving the communication request from the application 40, the communication middleware 10 acknowledges this and transmits the communication request to the external device 200 being the communication partner (step S15). The communication request is transmitted to the external device 200 by the communication processing unit 12. The data output that the application 40 has directed to the external device 200 is included in the communication request transmitted to the external device 200. It is to be noted that not only the transmission of the communication request by the communication middleware 10 as described in step S15 of FIG. 3 and transmission of a communication response by the external device 200 as described in step S16 of FIG. 3 but also signal transmission and reception are performed multiple times between the communication middleware 10 and the external device 200 according to a procedure conforming to a communication protocol being used.

Upon receiving the communication response from the external device 200 (step S16), the communication middleware 10 executes a buffering process (step S17). At step S17, the buffering process is executed by the communication processing unit 12 and is a process of storing, in the buffer area, information indicating a procedure of the communication performed at steps S15 and S16 with the external device 200. The buffer area is secured in the primary storage device 102. When the buffering process terminates, the communication middleware 10 determines whether or not the communication has succeeded. If the communication has been performed according to the correct procedure specified by the communication protocol, the communication processing unit 12 determines that the communication has succeeded. If the communication has not been performed according to the correct procedure, the communication processing unit 12 determines that the communication has failed. Examples of the case where communication has not being performed according to the correct procedure also includes a case where the signal from the external device 200 has not received within a predetermined time period. The method of determining whether or not communication has succeeded is not limited thereto. Here the description continues following the success of the communication. When the communication has succeeded, the communication middleware 10 transmits a communication response to the application 40 (step S18). This is where one round of communication processing between the application 40 and the external device 200 terminates. The communication response that the communication middleware 10 transmits at step S18 includes information indicating the success of the communication.

When a communication request is thereafter received again from the application 40 (step S19), the communication middleware 10 transmits the communication request to the external device 200 and receives a communication response from the external device 200, thus performing communication with the external device 200 (steps S20 and S21). The communication middleware 10 executes the buffering process again (step S22). These steps S20, S21, and S22 are the same as above-described steps S15, S16, and S17. When the buffering process terminates, the communication middleware 10 determines whether or not the communication has succeeded. Here the description continues on the assumption that the communication performed at steps S20 and S21 with the external device 200 has failed. If the communication has failed, the communication middleware 10 executes an information trace process (step S23). Specifically, the trace processing unit 11 first retrieves, from the buffer area, information which has been stored when the above buffering process has been executed, and writes, to the communication log file 22 of the storage unit 20, the retrieved information that is communication log information, along with information about a date and time of the retrieval. The writing here refers to additional writing. If there is no communication log file 22 in the storage unit 20, the trace processing unit 11 creates the communication log file 22. The above-mentioned "information about a date and time of the retrieval" is also information indicating the date and time of the failure of the communication. Next, the trace processing unit 11 requests, to the OS 30, the environmental information that is the information about the operating environment of the application 40, thus obtaining the environmental information. The trace processing unit 11 writes the obtained environmental information to the environmental information log file 21. This writing is the same as the writing of the environmental information to the environmental information log file 21 in the first information trace process that is the information trace process at above-described step S12. The information trace process that the trace processing unit 11 executes at step S23 is a second information trace process. It is to be noted that when the communication with the external device 200 has failed, the communication processing unit 12 notifies the trace processing unit 11 of the failure of the communication. The trace processing unit 11 executes the second information trace process upon receipt of this notification.

After executing the information trace process at step S23, the communication middleware 10 transmits a communication response to the application 40 (step S24). The communication response that the communication middleware 10 transmits at step S24 includes information indicating the failure of the communication.

The communication middleware 10 also executes the information trace process after every elapse of a predetermined fixed time period T since the reception of the activation request at above-described step S11 (steps S25 and S26). The information trace process that is executed at steps S25 and S26 is the same as the information trace process executed at above-described step S12. In other words, this is the first information trace process. Therefore, the communication middleware 10 executes the first information trace process after the elapse of the fixed time period T following the previous execution of the first information trace process.

When subsequent user operation of the application 40 of the electronic computer 100 eliminates the need for communication with the external device 200, the application 40 transmits a termination request to the communication middleware 10 (step S27). Upon receiving the termination request, the communication middleware 10 executes an information trace process (step S28) and transmits a termination response to the application 40 (step S29). The information trace process that the communication middleware 10 executes at step S28 is the same as the information trace process executed at above-described step S12. In other words, this is the first information trace process.

It is to be noted here that in the present embodiment, a case where the communication middleware 10 receives the activation request from the application 40, a case where the communication middleware 10 receives the termination request from the application 40, and a case where the fixed time period T has elapsed since the previous execution of the first information trace process by the communication middleware 10 each correspond to "when a first predetermined condition has been satisfied". The first information trace process is the information trace process that is executed at predetermined timings. It is also to be noted that the failure of the communication between the communication middleware 10 and the external device 200 corresponds to "when a second predetermined condition has been satisfied". The second information trace process is the information trace process that is executed when the communication middleware 10 fails to communicate with the external device 200.

Figure 4:
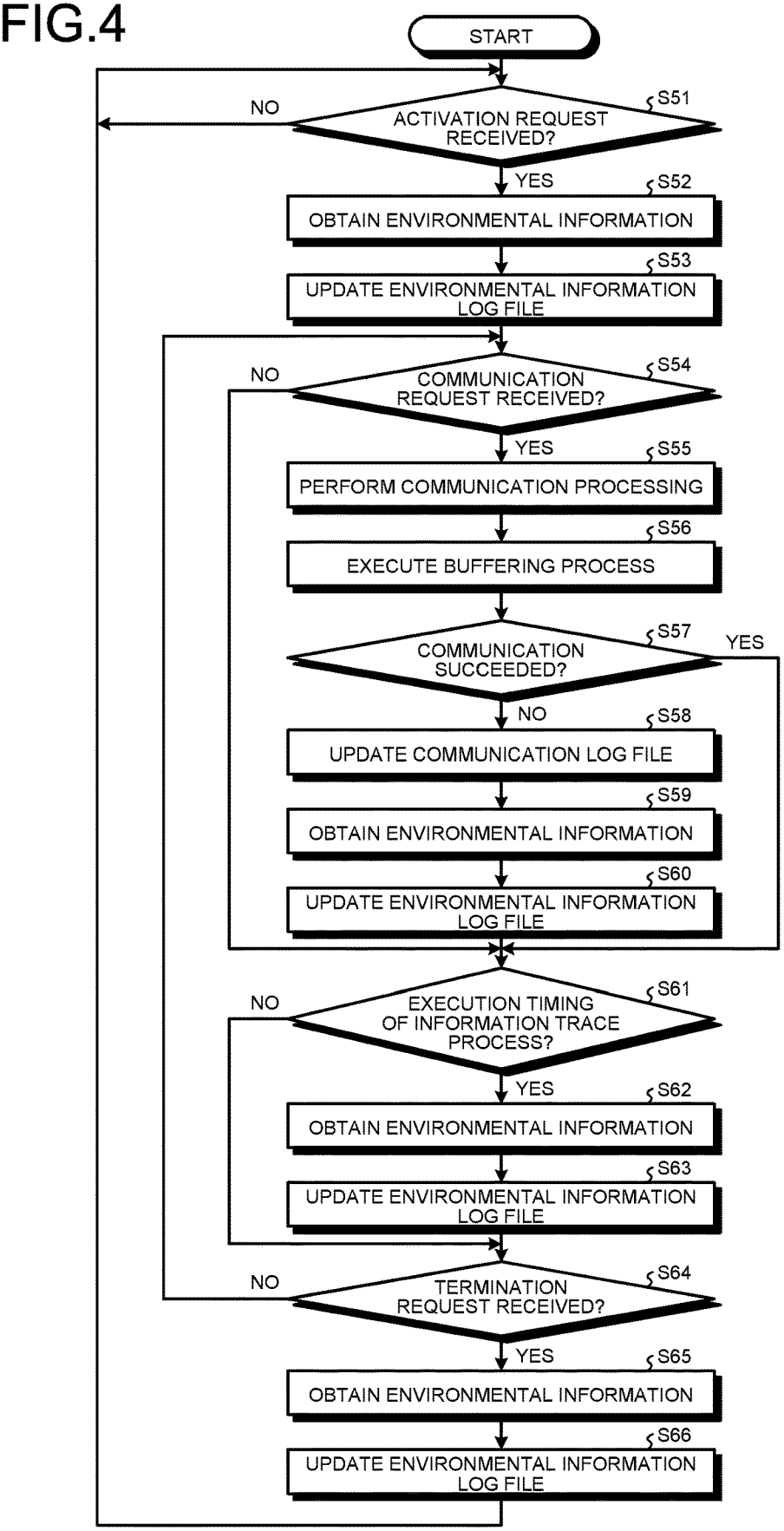
FIG. 4 is a flowchart illustrating the operational example of the communication middleware according to the embodiment.

The above-described operation of the communication middleware 10 is illustrated by a flowchart of FIG. 4. FIG. 4 is the flowchart illustrating the operational example of the communication middleware 10 according to the present embodiment.

When the communication middleware 10 starts operating, the communication middleware 10 first checks whether an activation request from the application 40 has been received or not (step S51). If there is no reception of the activation request (step S51: No), step S51 is repeated.

If the activation request has been received (step S51: Yes), the communication middleware 10 obtains the environmental information (step S52) and updates the environmental information log file 21 (step S53). These steps S52 and S53 correspond to the first information trace process described above.

Next, the communication middleware 10 checks whether a communication request from the application 40 has been received or not (step S54). If there is no reception of the communication request (step S54: No), a transition is made to step S61. If the communication request has been received (step S54: Yes), communication processing is performed in relation to the external device 200 (step S55).

Next, the communication middleware 10 executes a buffering process (step S56). The buffering process corresponds to the buffering process at steps S17 and S22 illustrated in FIG. 3. After the buffering process terminates, the communication middleware 10 checks whether or not the communication performed at above-described step S55 has succeeded. If the communication has succeeded (step S57: Yes), a transition is made to step S61.

If the communication has failed (step S57: No), the communication middleware 10 updates the communication log file 22 (step S58). Moreover, the communication middleware 10 obtains the environmental information (step S59) and updates the environmental information log file 21 (step S60). Steps S58 to S60 correspond to the information trace process at step S23 illustrated in FIG. 3, that is to say, the second information trace process.

When the communication middleware 10 has determined at above-described step S54 that no communication request has been received or the communication middleware 10 has carried out step S60, the communication middleware 10 checks whether a timing of the information trace process to execute has been reached or not (step S61). When a time period which has elapsed since it has been determined at step S51 that the activation request has been received has reached an integer multiple of the predetermined fixed time period T, the communication middleware 10 determines that the timing of the information trace process to execute has been reached.

If the timing of the information trace process to execute has been reached (step S61: Yes), the communication middleware 10 obtains the environmental information (step S62) and updates the environmental information log file 21 (step S63). Steps S62 and S63 correspond to the information trace process at steps S25 and S26 illustrated in FIG. 3.

When the communication middleware 10 has determined that the timing of the information trace process to execute has not been reached (Step S61: No) or the communication middleware 10 has carried out step S63, the communication middleware 10 checks whether a termination request has been received or not (step S64).

If there is no reception of the termination request (step S64: No), communication middleware 10 makes a transition to step S54. If the termination request has been received (step S64: Yes), the communication middleware 10 obtains the environmental information (step S65) and updates the environmental information log file 21 (step S66). Steps S65 and S66 correspond to the information trace process at step S28 illustrated in FIG. 3. After the communication middleware 10 carries out step S66, a transition is made to step S51.

The communication middleware 10 performs the above operations for the plurality of applications 40. In other words, after each reception of an activation request from the application 40, the communication middleware 10 operates pursuant to FIGS. 3 and 4 for the application 40 which has sent the activation request. For example, the communication middleware 10 executes the first information trace process upon receiving an activation request from the application A. Until a termination request is received from the application A, the communication middleware 10 executes the second information trace process when communication has thereafter failed, and also executes the first information trace process after every elapse of the fixed time period. When the communication middleware 10 has received an activation request from the application B after having received the activation request from the application A but before receiving the termination request, the communication middleware 10 executes the first information trace process. The communication middleware 10 executes the second information trace process when communication between the application B and the external device 200 has thereafter failed, and also executes the first information trace process after every elapse of the fixed time period since the reception of the activation request from the application B. The communication middleware 10 may either create the environmental information log file 21 and the communication log file 22 for each application individually or create only one environmental information log file 21 and only one communication log file 22. If only one environmental information log file 21 and only one communication log file 22 are created, that is to say, when results of the first and second information trace processes executed for each application are written to the one environmental information log file 21 and the one communication log file 22, the communication middleware 10 also writes information about the application, such as a name, to the files 21 and 22.

In the above-described second information trace process, the information that is written to the environmental information log file 21 may be varied according to a reason for a failure of communication. This is because if there is a different reason why communication has failed, different information is necessary for identifying a cause of the failure. For example, for a hardware problem such that communication has failed because a signal transmitted from the external device 200 which is a communication partner has not reached within the predetermined time period, the communication middleware 10 obtains, from the OS 30, information including a status of the main memory, a status of a communication port, and a status of a communication driver. For a software problem such that communication has failed because a correct communication procedure is not performed, information including a status of the main memory and a running task is obtained from the OS 30. In this way, log file size can be prevented from increasing more than necessary.

As illustrated by FIGS. 3 and 4, the operation of the communication middleware 10 is performed such that the information trace process is executed after every elapse of the fixed time period since the operation has started with the reception of the activation request from the application 40, which means that the information trace process is repeated at regular intervals regardless of whether there is communication to perform or not. However, the interval between the information trace processes to execute may be varied over time.

Figure 5:
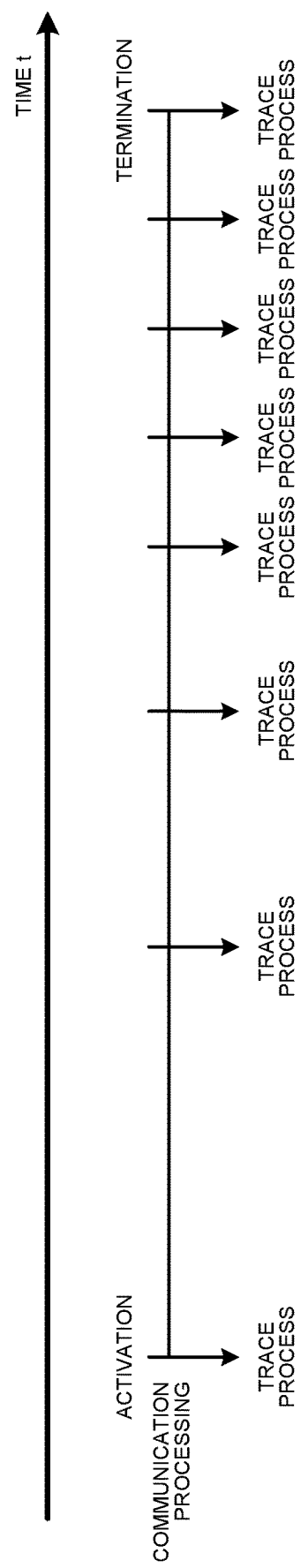
FIG. 5 illustrates an example of timing of an information trace process that the communication middleware according to the embodiment executes.

For example, as FIG. 5 illustrates, the interval between the first information trace processes to execute repetitively may become shorter over time since the communication middleware 10 has been activated by reception of an activation request. It is to be noted that in FIG. 5, the information trace process is described as "trace process". The same applies to FIG. 6. In a system that uses the communication middleware 10, following activation of the communication middleware 10, the system is generally stable for a period of time with less need for execution of the trace process for logging because the application 40 and the communication middleware 10 have not operated before the activation. Therefore, the trace process is not executed before a fixed time period elapses following the activation, and after the elapse of the fixed time period, the interval between the first information trace processes to execute is gradually decreased. In this way, log file capacity can be prevented from increasing while information which is possibly linked to a defect can be retained in a log file.

In another example illustrated by FIG. 6, the interval between the first information trace processes that the communication middleware 10 executes repetitively after being activated by reception of an activation request, may be varied not over time but according to the number of times of communication processing to perform. In other words, the communication middleware 10 executes the first information trace process after each time the communication processing is performed N times with a value of N gradually varied to become smaller. In this case, in a system in which communication from the application 40 is performed only upon a request caused by user operation and not at regular intervals, log file capacity can be prevented from increasing while information which is possibly linked to a defect can be retained in a log file.

As described above, the communication middleware according to the present embodiment executes the first information trace process when the first predetermined condition has been satisfied, and executes the second information trace process when the second predetermined condition has been satisfied. When an activation request has been received from the application, when a termination request has been received from the application, or when the time period T has elapsed following the previous execution of the first information trace process, the communication middleware determines that the first condition has been satisfied. In the first information trace process, the environmental information is obtained from the OS and is written to the environmental information log file by the communication middleware. The communication middleware also determines that the second condition has been satisfied when communication with the external device has failed. In the second information trace process, the communication log information is retrieved from the buffer area and is written to the communication log file by the communication middleware, and the environmental information is obtained from the OS and is written to the environmental information log file by the communication middleware. A value of the above time period T may be varied by the communication middleware to become smaller after each execution of the first information trace process. The communication middleware may determine that the first condition has been satisfied when communication with the external device has been performed as many times as the predetermined count N after the previous execution of the first information trace process. The value of the count N here may be varied by the communication middleware to become smaller after each execution of the first information trace process. The communication middleware according to the present embodiment retains by storing in the log file not only the environmental information at the time of the failure of communication but also the environmental information before the failure of communication, so that a cause can be identified even when the communication failure is caused under influence of, for example, a status of use of the main memory and/or an operational status of another application.

The above configuration illustrated in the embodiment is illustrative of contents of the present invention, can be combined with other techniques that are publicly known and can be partly omitted or changed without departing from the gist of the present invention.

REFERENCE SIGNS LIST 10 communication middleware; 11 trace processing unit; 12 communication processing unit; 20 storage unit; 21 environmental information log file; 22 communication log file; 30 operating system (OS); 40 application; 100 electronic computer; 200 external device.

The invention claimed is:

1. An information processing device that is implemented when an electronic computer executes middleware, the information processing device comprising:
a processor; and
a memory to store the middleware which, when executed by the processor, performs processes of:
performing communication with an external device according to an instruction from application software installed on the electronic computer; and
executing a first information trace process when a first condition that is predetermined is satisfied and executing a second information trace process when a second condition that is predetermined is satisfied, the first information trace process including obtaining, from an operating system installed on the electronic computer, environmental information that is information about an operating environment of the application software and writing the environmental information to an environmental information log file, the second information trace process including writing, to a communication log file, information indicating a procedure of communication performed with the external device, obtaining the environmental information from the operating system, and writing the environmental information to the environmental information log file, wherein
the processor determines that the first condition is satisfied when communication is performed as many times as a predetermined count after previous execution of the first information trace process, and
the processor determines that the second condition is satisfied when communication between the processor and the external device fails.

2. The information processing device according to claim 1, wherein
the environmental information is information indicating an operating state of the operating system.

3. The information processing device according to claim 1, wherein
the environmental information includes information indicating a status of use of main memory.

4. The information processing device according to claim 1, wherein
the processor determines that the first condition is satisfied when an activation request is received from the application software.

5. The information processing device according to claim 1, wherein
the processor determines that the first condition is satisfied when a termination request is received from the application software.

6. The information processing device according to claim 1, wherein
the processor determines that the first condition is satisfied when a predetermined time period has elapsed since previous execution of the first information trace process.

7. The information processing device according to claim 6, wherein
the predetermined time period is varied by the processor to become shorter after each execution of the first information trace process.

8. The information processing device according to claim 1, wherein the predetermined count is varied by the processor to become lower after each execution of the first information trace process.

9. The information processing device according to claim 1, wherein
a detail of the environmental information that is obtained from the operating system in the second information trace process is varied by the processor according to a reason why communication between the processor and the external device fails.

10. The information processing device according to claim 1, wherein
the writing to the environmental information log file is performed by additional writing in the first information trace process, and the writing to the environmental information log file and the writing to the communication log file are performed by additional writing in the second information trace process.

11. An information processing method to be carried out by an information processing device that is implemented when middleware is executed by an electronic computer with an operation system and application software installed on the electronic computer, the information processing method comprising:
performing communication with an external device according to an instruction from the application software;
executing a first information trace process when a first condition that is predetermined is satisfied, the first information trace process including obtaining, from the operating system, environmental information that is information about an operating environment of the application software and writing the environmental information to an environmental information log file; and
executing a second information trace process when a second condition that is predetermined is satisfied, the second information trace process including writing, to a communication log file, information indicating a procedure of communication with the external device, obtaining the environmental information from the operating system, and writing the environmental information to the environmental information log file, wherein
in the first information trace, it is determined that the first condition is satisfied when communication is performed as many times as a predetermined count after previous execution of the first information trace, and
when communication with the external device fails in the communication processing, it is determined that the second condition is satisfied.

12. The information processing method according to claim 11, wherein
when an activation request is received from the application software, it is determined that the first condition is satisfied.

13. The information processing method according to claim 11, wherein
when a termination request is received from the application software, it is determined that the first condition is satisfied.

14. The information processing method according to claim 11, wherein
the writing to the environmental information log file is performed by additional writing in the first information trace process, and the writing to the environmental information log file and the writing to the communication log file are performed by additional writing in the second information trace process.

15. A non-transitory computer readable medium that stores a program that causes a computer to execute processes of:
performing communication with an external device according to an instruction from application software;
executing a first information trace process when a first condition drat is predetermined is satisfied, the first information trace process including obtaining, from an operating system, environmental information that is information about an operating environment of the application software and writing the environmental information to an environmental information log file; and
executing a second information trace process when a second condition that is predetermined is satisfied, the second information trace process including writing, to a communication log file, information indicating a procedure of communication with the external device, obtaining the environmental information from the operating system, and writing the environmental information to the environmental information log file, wherein
in the executing the first information trace process, it is determined that the first condition is satisfied when communication is performed as many times as a predetermined count after previous execution of the first information trace, and
when communication with the external device has failed in the communication with the external device according to the instruction from application software, it is determined that the second condition is satisfied.

16. The program according to claim 15, wherein
when an activation request is received from the application software, it is determined that the first condition is satisfied.

17. The program according to claim 15, wherein
when a termination request is received from the application software, it is determined that the first condition is satisfied.

18. The non-transitory computer readable medium according to claim 15, wherein the writing to the environmental information log file is performed by additional writing in the first information trace process, and the writing to the environmental information log file and the writing to the communication log file are performed by additional writing in the second information trace process.

* * * * *